(12) United States Patent
Parlee

(10) Patent No.: US 7,508,653 B2
(45) Date of Patent: Mar. 24, 2009

(54) LOAD CENTER WITH PLUG IN NEUTRAL CONNECTIONS

(75) Inventor: Bradley E. Parlee, Maitland, FL (US)

(73) Assignee: General Electric Company, Schenectady, NY (US)

( * ) Notice: Subject to any disclaimer, the term of this patent is extended or adjusted under 35 U.S.C. 154(b) by 34 days.

(21) Appl. No.: 11/646,210

(22) Filed: Dec. 27, 2006

(65) Prior Publication Data

US 2008/0158787 A1 Jul. 3, 2008

(51) Int. Cl.
H02B 1/20 (2006.01)

(52) U.S. Cl. .................. 361/652; 361/636; 361/637; 361/673; 439/213; 439/507

(58) Field of Classification Search .......... 361/641, 361/652–653, 673
See application file for complete search history.

(56) References Cited

U.S. PATENT DOCUMENTS

| 3,398,249 | A | * | 8/1968 | Dessert | 200/294 |
|---|---|---|---|---|---|
| 3,922,586 | A | * | 11/1975 | Buxton et al. | 361/643 |
| 4,004,197 | A | * | 1/1977 | Hawkes, Jr. | 361/636 |
| 4,020,400 | A | * | 4/1977 | Hawkes et al. | 361/636 |
| 4,783,718 | A | * | 11/1988 | Raabe et al. | 361/652 |
| 4,785,378 | A | * | 11/1988 | Hinckley et al. | 361/652 |
| 5,179,491 | A | * | 1/1993 | Runyan | 361/45 |
| 5,805,414 | A | * | 9/1998 | Feldhaeusser | 361/637 |
| 5,835,341 | A | * | 11/1998 | Rhodes et al. | 361/637 |
| 6,664,469 | B1 | * | 12/2003 | Sweeney | 174/51 |

* cited by examiner

Primary Examiner—Gregory D Thompson
(74) Attorney, Agent, or Firm—Ohlandt, Greeley, Ruggiero & Perle, LLP.

(57) ABSTRACT

A load center with a circuit breaker with a first recess and a second recess, a main busbar with a first stab that is operatively arranged to insert into the first recess and support a front end of the circuit breaker. The load center also includes a neutral support bar having a second stab and a lug. The lug is connected to a neutral system and the second stab is operatively arranged to insert into the second recess of the circuit breaker. The second stab also supports a back end of the circuit breaker.

11 Claims, 2 Drawing Sheets

LOAD CENTER WITH PLUG IN NEUTRAL CONNECTIONS

BACKGROUND

1. Field

This present disclosure relates generally to circuit breakers and, more particularly, to circuit breakers with plug in neutral connections.

2. Description of the Related Art

Changing National Electrical Code (NEC) requirements are increasing the number of arc fault breakers required in every residential installation. For each breaker added, the labor required to connect neutral lines is doubled. Additionally, the additional short length of wire between the back of breaker and the neutral bar can create an untidy installation.

Currently, breakers are mounted in a load center by hooking the back of breaker on a support rail and plugging the front of breaker onto a hot bus stab. This system was sufficient in the past, since the vast majority of residential circuit breakers had no need to monitor the neutral current. Only ground fault circuit interrupter (GFCI) breakers required neutral current be routed back through the breaker for analysis. Since the number of GFCI breakers is low, typically only one or two per panel, a neutral conductor out of the back of breaker and secured to the traditional neutral bar is acceptable.

In recent years, the addition of arc fault circuit interrupter breakers (AFCI) to residential NEC has created additional need for neutrals to go back through the breakers. Future codes will expand on this trend, and it is expected that all circuits may eventually have breakers that require neutral to be monitored.

Current methods of making neutral connections in breakers are cumbersome and time consuming. Additionally, the current methods of making neutral connections are bulky and difficult to organize.

Accordingly, there is a need for an improved method and apparatus for making neutral connections in circuit breakers that will overcome, alleviate, and/or mitigate one or more of the aforementioned and other deleterious effects of prior art circuit breakers.

SUMMARY

In one aspect, a load center is provided. The load center has a circuit breaker with a first recess and a second recess, a main busbar with a first stab that is operatively arranged to insert into the first recess and support a front end of the circuit breaker. The load center also includes a neutral support bar having a second stab and a lug. The lug provides connection to the neutral system of conductors and the second stab is operatively arranged to insert into the second recess of the circuit breaker. The second stab also supports a back end of the circuit breaker.

In another aspect, a neutral support bar for a load center is also provided. The neutral support bar has a linear bar with a plurality of stabs, a main lug, and a plurality of smaller lugs. The linear bar, the plurality of stabs, the main lug and the plurality of smaller lugs all conduct electricity. The plurality of stabs are operatively arranged to insert into a circuit breaker and support one end of the circuit breaker. The main lug provides connection capability to a neutral system. Each of the plurality of smaller lugs are connectable to a neutral line, and the plurality of stabs extend from the linear bar. The plurality of stabs are operatively arranged to insert into a circuit breaker and support one end of the circuit breaker. Together the elements of the neutral support bar provide all the line side neutral line side electrical connections for the loadcenter and mechanical support for the circuit breaker.

The above-described and other features and advantages of the present disclosure will be appreciated and understood by those skilled in the art from the following detailed description, drawings, and appended claims.

BRIEF DESCRIPTION OF THE DRAWINGS

These and other objects of the present disclosure will be more apparent from the following detailed description of the present disclosure, in conjunction with the accompanying drawings wherein.

DETAILED DESCRIPTION OF THE PREFERRED EMBODIMENT

Figure 1:
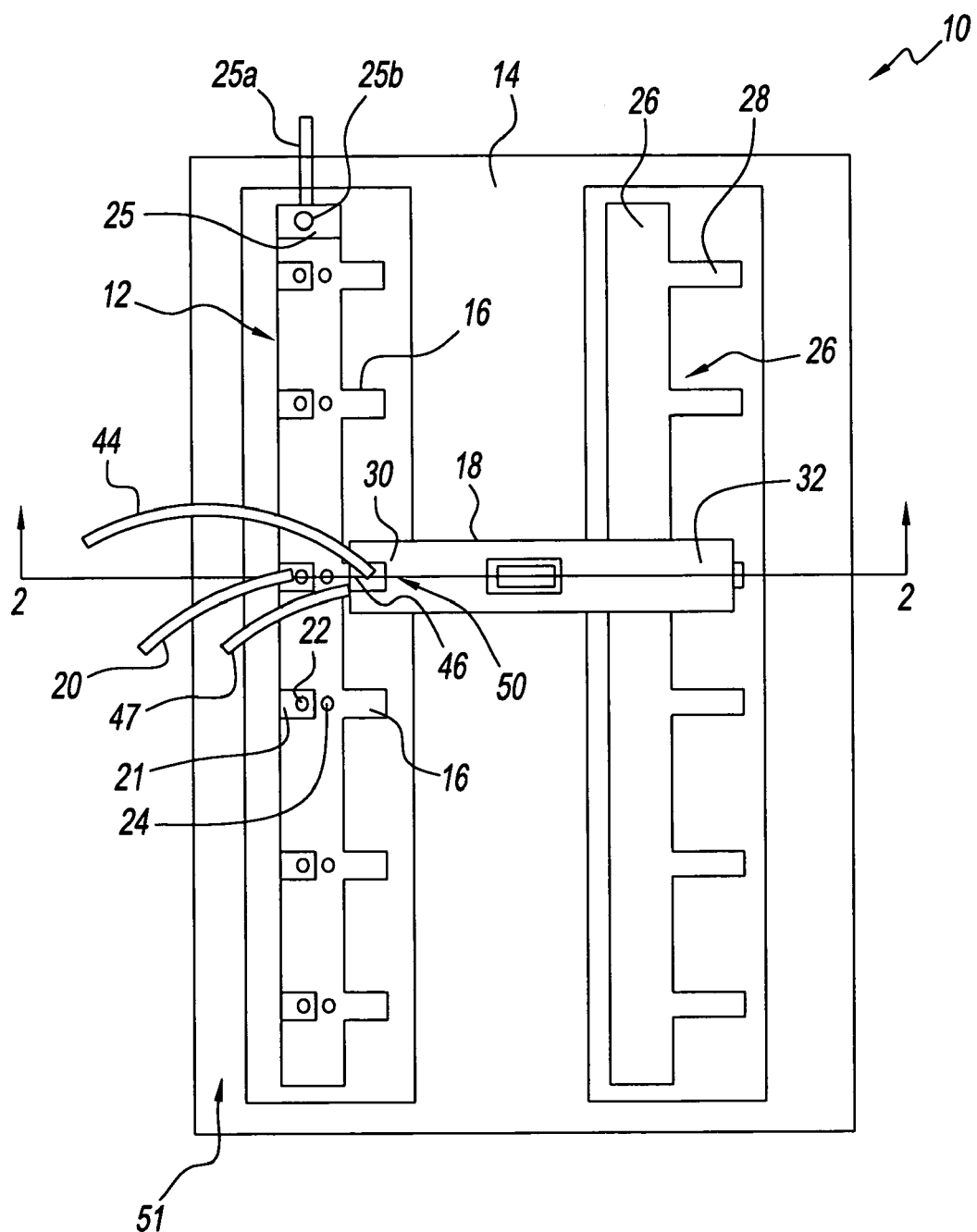
FIG. 1 is a top plan view of a load center of the present disclosure.
Figure 2:
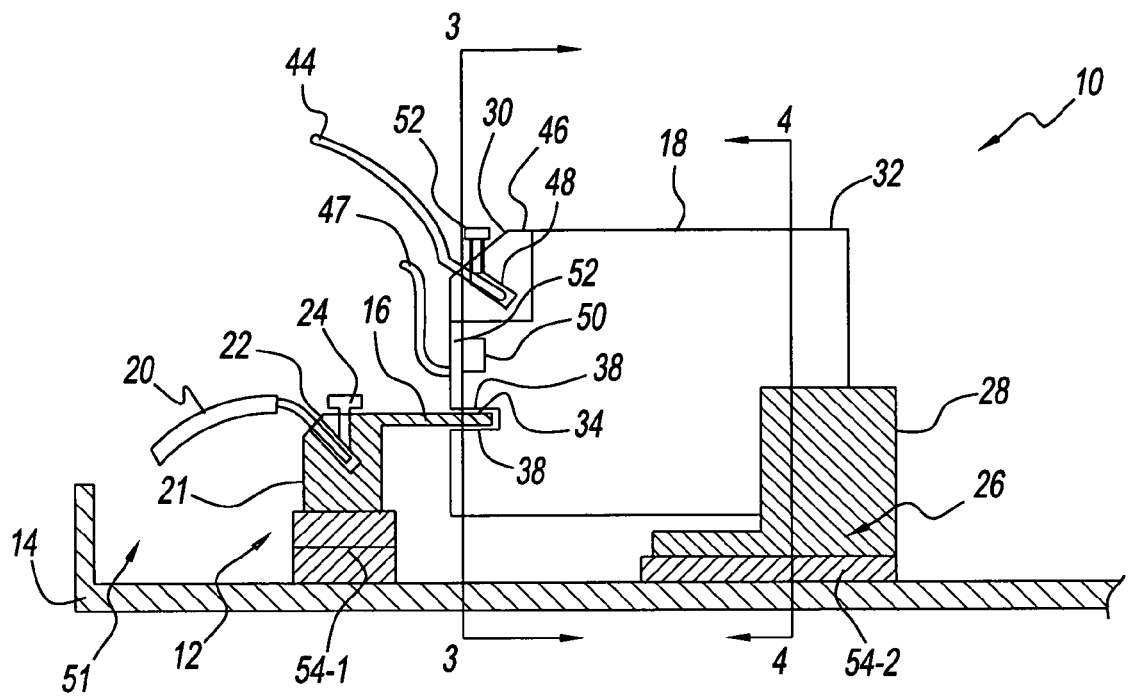
FIG. 2 is a cross-sectional view, taken generally along line 2-2, of the load center in FIG. 1.

Referring now to FIG. 1, an exemplary embodiment of a load center generally referred to by reference numeral 10 is illustrated. Load center 10 has a neutral support bar 12 attached to case 14. Neutral support bar 12 has neutral stabs 16 positioned to insert inside breaker 18. Neutral support bar 12 functions as the neutral busbar, i.e., the location that neutral lines are connected and the neutral busbar can be connected to neutral system. Neutral support bar 12 also functions as support for breaker 18. Neutral lines 20 are wired to neutral support bar 12 by inserting the neutral lines into recess 22 of lug 21 and securing with screw 24. Therefore, load center 10, and more specifically, neutral support bar 12, provide support on the neutral side of circuit breaker 18, a location to connect circuit breakers that monitor neutral lines, i.e., GFCI and AFCI breakers, and provide a location to connect neutral lines 20 for standard breakers.

Main lug 25 on neutral support bar 12 enables a ground or neutral system wire 25a to be wired to load center 10 using fastener 25b. Fastener 25b can be a screw or similar fastener that threads into lug 25 to attach ground wire 25b.

Load center 10 also has a main busbar 26 attached within case 14. Main busbar 26 has stabs 28 positioned to supply electricity from main busbar 26 to breaker 18. One means of connecting breaker 18 is to have a plug in type connection on the hot side of breaker 18. A plug in type breaker 18 is pushed with downward pressure against stab 28 on the hot side 32 until stab 28 is securely connected to breaker 18. Hot side 32 of breaker 18 can also be attached to stab 28 using another known connection type.

In an exemplary embodiment, neutral side 30 of breaker 18 is connected to neutral support bar 12 by inserting or plugging stab 16 into the lower end of breaker 18. Specifically, attachment of breaker 18 to load center 10 is accomplished by first inserting stab 16 into a neutral recess 34 in the lower end of breaker 18. Breaker 18 can be slightly slanted as stab 16 is inserted into recess 34 to assist in the insertion step. In this respect breaker 18 is hooked to stab 16. Hot side 32 of breaker 18 can then be lowered toward stab 28. Recess 36 on hot side 32 of breaker 18 receives stab 28 as breaker 18 is pressed down against stab 28 or stab 28 is plugged into hot side recess 36.

Recess 34 is a shown as a horizontally aligned rectangular opening, disposed proximate the bottom of neutral side 30 on breaker 18. Recess 34 can be other shapes and can be positioned at other positions on breaker 18. For example, recess 34 can be a circular aperture, or a slot that extends the width of breaker 18. In an exemplary embodiment, the configuration and shape of recess 34 will match the configuration and shape of neutral stab 16. Although contacts 38 show a slight gap between stab 16 and contacts 38, stab 16 should fit into recess 34 tight enough to ensure that contacts 38 in recess 34 are in contact with neutral stab 16 when breaker 18 is plugged into place on load center 10.

The positioning and shaped of contacts 38 can be altered from the embodiments shown in the figures. In some embodiments, the contacts can encompass every wall of recess 34.

Recess 36 is shown as a vertically aligned rectangular opening, disposed proximate the bottom of hot side 32. Recess 36 can be other shapes and can be positioned at other positions on breaker 18. For example, recess 36 can be a circular aperture, or a slot that extends the width of breaker 18. In an exemplary embodiment, the configuration and shape of recess 34 will match the configuration and shape of hot stab 28. Although a slight gap is shown between stab 28 and contacts 40, stab 28 should fit into recess 36 tight enough to ensure that contacts 40 are in direct contact with main busbar stab 28 when breaker 18 is plugged into place on load center 10.

The positioning and shape of contacts 40 can be altered from the embodiments shown in the figures. In some embodiments, the contacts can encompass every wall of recess 36.

Breaker 18 can be a conventional circuit breaker that has no connection to neutral line 20, or in an exemplary embodiment of the disclosure it can be a GFCI of AFCI breaker, which monitors the current flowing back through neutral line, and can have a neutral line attached. For instance, neutral line 20 can be hard wired (not shown) into breaker 18 to enable monitoring of a potential ground fault or an arc fault in the line serviced by the breaker. In such an embodiment, the neutral line 20 coming out of the breaker would be connected to neutral support bar 12 by inserting it into lug 22 and fastening the wire for neutral line 20 inside lug 22 with screw 24.

Hot lines 44 are connected to breaker 18 using lug 46. Line 44 is inserted into recess 48 of lug 46, which can be slanted as shown or recess 48 can have another configuration. Line 44 can be fastened inside recess 48 using fastener 52, which can be a screw or a similar fastener.

Figure 3:
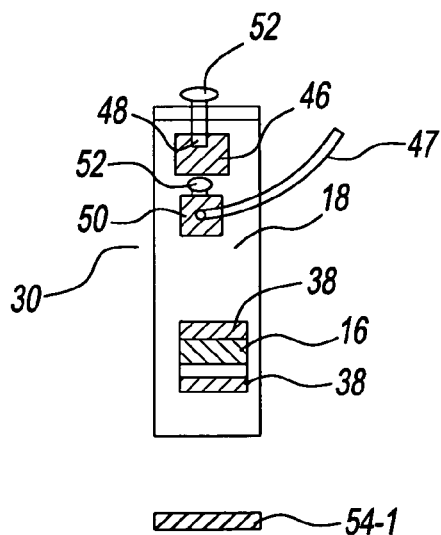
FIG. 3 is a cross-sectional view of the load center in FIG. 1, taken generally along line 3-3 in FIG. 2.
Figure 4:
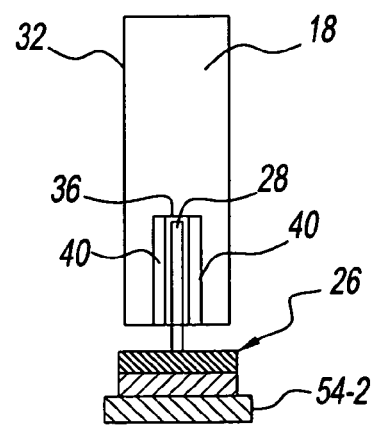
FIG. 4 is a cross-sectional view of the load center in FIG. 1, taken generally along line 4-4 in FIG. 2.

In cases where a GFCI of AFCI breaker is used a neutral line 47 can be fastened to breaker 18 using lug 50 and fastener 52. The arrangement and positioning of lug 50 and fastener 52 can be changed from the positioning shown in FIG. 3. For instance, it may be beneficial to stagger the placement of lug 46 and lug 50 to ease the installation of such a breaker. Neutral line 47 differs from neutral line 20 discussed previously, such that neutral line 47 is the neutral line returning from the service line to be monitored by the GFCI or an AFCI breaker. Neutral line 20 is the neutral that would be used in cases where a standard breaker (e.g., non-GFCI) is used that does not have the capacity to receive a neutral line.

Although FIGS. 1-4 show only a single neutral support bar 12, a single main busbar 26, and a single circuit breaker 18, it should be appreciated that multiples of these structures can be used with load center 10. For instance in some embodiments, a row of breakers 18 can be attached to a neutral support bar 12 and a main busbar 26, and another row of breakers 18 can be attached to a separate neutral support bar and main busbar on the opposite side of main busbar 26; thereby producing a load center with two parallel rows of breakers 18.

The support for neutral side 30 of breaker 18 and the function of neutral busbar is all performed by neutral support bar 12. By acting as a ground for the load center 10 and as support for neutral side 30 of breakers 18 attached to load center 10, neutral support bar 12 enables the elimination of a separate support bar for breakers on the neutral side. It also eliminates the cluttered wires typically found in load centers with GFCI of AFCI breakers. Support for neutral side 30 is provided entirely by stabs 16 on neutral support bar 12. This eliminates the need for a dedicated support that only functions as support on the neutral side of the breaker.

Neutral support bar 12 can also provides a wider wire gutter 51 in load center 10. Wire gutter 51 is wider due to the elimination of typical separate components of a load center, i.e., a neutral busbar and breaker support for the neutral side of the breaker. Since support is required on both sides of a breaker to provide a stable installation, the elimination of a support bracket entirely was not possible. Also, a neutral busbar is needed to connect neutral lines. Therefore, the combining of these functions in one neutral support bar 12 provides wider wire gutter 51, which eases installation, reduces manufacturing time and installation time, and provides a more organized channel to position the many wires connected to neutral support bar 12 and breakers 18.

A neutral insulator 54-1 can be positioned under neutral support bar 12 to insulate neutral support bar 12 from conducting electricity to cover 14 or any other components in load center 10 that are not wired to neutral support bar 12. A main bus insulator 54-2 can be positioned under main busbar 26 to insulate main busbar 26.

The particular type, including materials, dimensions and shape, of the neutral support bars 12, and other components described in this disclosure, can vary according to the particular needs of load center 10.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for implementing the contents of this disclosure, but that the disclosure will include all embodiments falling within the scope of the appended claims.

What is claimed is:

1. A load center, comprising:
    a circuit breaker having a first recess and a second recess;
    a main busbar having a first stab that is operatively arranged to be inserted into said first recess and said first stab supports a front end of said circuit breaker; and
    a neutral support bar having a second stab and a lug, wherein said lug is connected to a neutral system and said second stab is operatively arranged to be inserted into said second recess, and said second stab supports a back end of said circuit breaker.

2. The load center of claim 1, wherein said second stab extends from said neutral support bar.

3. The load center of claim 1, further comprising a plurality of second stabs, wherein said plurality of second stabs extend from said neutral support bar and all of said second stabs are on the same plane.

4. The load center of claim 1, wherein said second recess extends to the perimeter edge of said circuit breaker.

5. The load center of claim 1, wherein said neutral support bar and said second stab conduct electricity.

6. The load center of claim 1, wherein said second recess is disposed proximate the base of said circuit breaker.

7. The load center of claim 1, wherein said circuit breaker has a neutral line running directly into said circuit breaker.

8. The load center of claim 7, wherein said neutral line in hardwired into said circuit breaker.

9. A neutral support bar for a load center, comprising:
a linear bar having a plurality of stabs, a main lug and a plurality of smaller lugs, wherein said linear bar, said plurality of stabs, said main lug and said plurality of smaller lugs conduct electricity, said main lug is connectable to neutral system, each of said plurality of smaller lugs are connectable to a neutral line, said plurality of stabs extend from said linear bar, and said plurality of stabs are operatively arranged to be inserted into a circuit breaker and support one end of the circuit breaker.

10. The support bar of claim 9, wherein each of said plurality of stabs insert into an individual circuit breakers and each of said plurality of stabs support a neutral side of the individual circuit breaker.

11. The support bar of claim 9, further comprising at least one fastener disposed on said smaller lugs, wherein said fastener is arranged to fasten said neutral lines inside said recesses.

* * * * *